Jan. 14, 1958     E. W. HANSEN     2,819,634

ROPE END BINDING AND FERRULE CRIMPING TOOL

Filed June 5, 1956

INVENTOR.
ELMER W. HANSEN
BY
ATTORNEYS

United States Patent Office 2,819,634
Patented Jan. 14, 1958

2,819,634

ROPE END BINDING AND FERRULE CRIMPING TOOL

Elmer W. Hansen, Enid, Okla.

Application June 5, 1956, Serial No. 589,565

5 Claims. (Cl. 81—15)

(Granted under Title 35, U. S. Code (1952), sec. 266)

The invention described herein may be manufactured and used by or for the United States Government for governmental purposes without payment to me of any royalty thereon.

This invention relates to a rope end binding tool and more particularly to an improved device for securing ferrules or metal clips of varying sizes to rope ends for the purpose of preventing fraying. Aircraft tie down rope must through necessity be of a prescribed length and cannot be knotted due to limited size of the ramp tie down eyelets and also eyelets installed on the aircraft. If the rope frays at the end it must be cut away. This shortens the rope and renders it useless as a tie down or chock rope. Ropes can be braided back at the end but this consumes a considerable amount of the mechanic's time. When the rope has frayed until its usable and effective length is less than that required by the task it must perform, then the entire length of rope must be thrown away and replaced with new rope. Records have shown that the waste cost of this operation is extremely high and that if this waste could be eliminated, an annual saving would result. Records have also shown that a length of rope used for tie downs and chocks become completely unusable within six weeks of their installation.

It is the object of this invention to eliminate this waste in Air Force tie down ropes.

It is a further object of the invention to eliminate waste wherever rope is used.

A further object of the invention is specifically to provide a tool for securing a ferrule or other metal ring to rope ends to eliminate fraying so that the rope will remain usable in its entire length throughout the entire life of the rope.

A further object of the invention is the provision of a clamping tool for securing rings or ferrules of various size to varying size of rope with clamping heads so arranged that they may be struck by a mallet, hammer or other tool for providing additional percussion force for the clamping of ferrules.

A further object of the invention is to provide a tool which will secure rings or ferrules of various sizes onto the ends of various sizes of rope. Other advantages will appear as the description proceeds.

Figure 1:
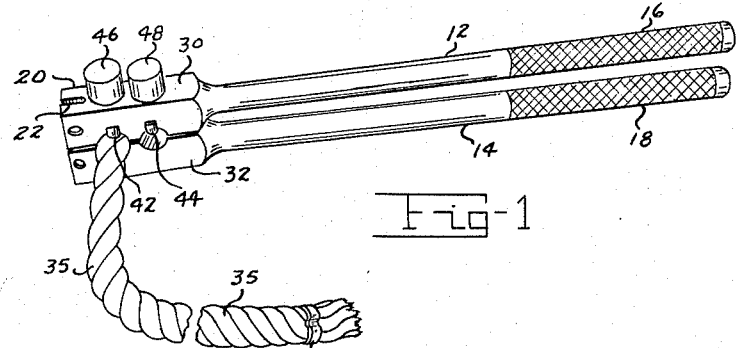
Fig. 1 is a perspective view of the device showing the device in operation and also showing a ferrule which has been secured to a rope by means of the device.
Figure 2:
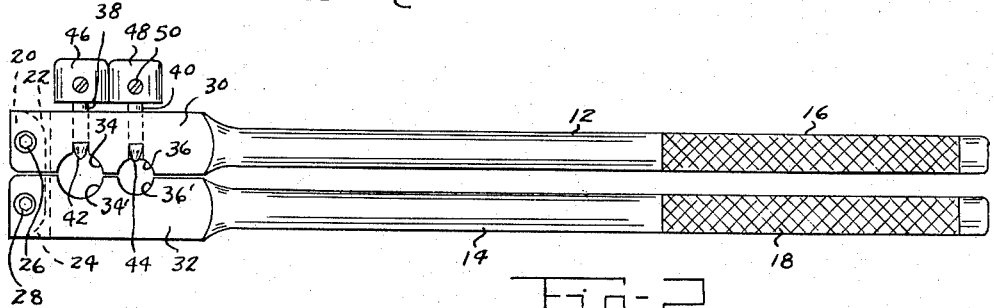
Fig. 2 is a side elevation.
Figure 3:
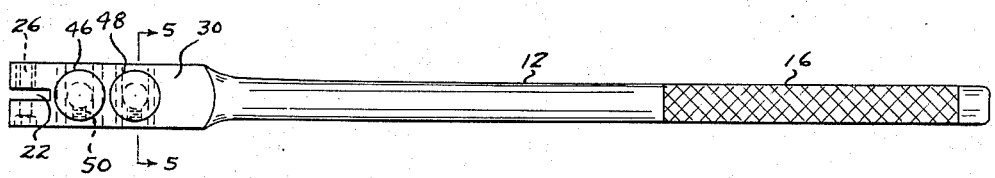
Fig. 3 is a top plan view.
Figure 4:
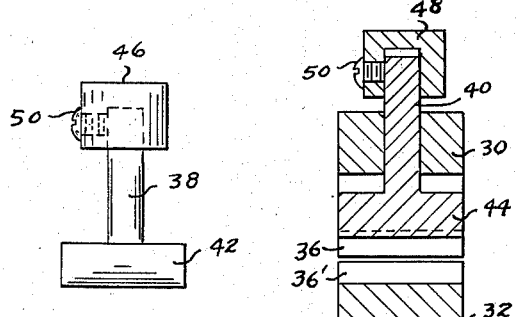
Fig. 4 is a detail of the plunger.
Figure 5:
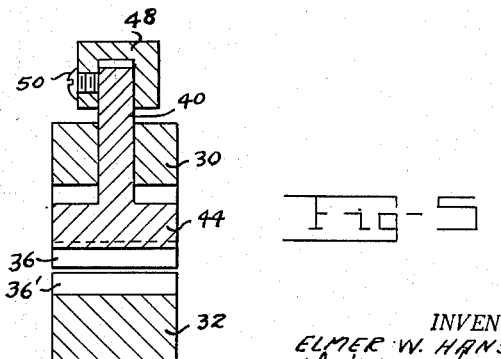
Fig. 5 is a cross sectional view taken on the line 5—5 of Fig. 3.

Referring more in detail to the drawing, the device is indicated generally by the numeral 10 and comprises a pair of handles 12 and 14. These handles may have knurled ends as shown at 16 and 18, or they may be covered with plastic or other hand grips. The handles 12 and 14 lie parallel and are secured together for pivotal action by any means suitable for the purpose. In the form shown in the drawing, a plate or link 20 is held within a pair of slots 22 and 24 which are present in the ends of the arms 12 and 14, and is secured therein by means of a pair of pivot pins 26 and 28.

The ends of the arms 12 and 14 adjacent the pivots are provided with clamp portions 30 and 32 which are rectangular in cross section as shown, but need not necessarily be so. The facing surfaces of the clamp portions 30 and 32 are provided with transverse semicircular concave portions 34, 34', 36 and 36'. The concavities 34 and 34' have the same diametric proportions and the cavity formed therebetween is adapted to receive rope shown at 35 varying in size within definite limits. The concavities 36 and 36' are smaller in diameter and are adapted for the processing of rope of smaller diameter.

The clamp element 30 is provided with a pair of openings, which extend entirely therethrough and communicate symmetrically with the concavities 34 and 36. A pair of transversely located channels communicate with said concavities and said openings, and accommodate a pair of cap pin and ferrule deforming or crimping member assemblies. In assembling, the pins 38 and 40 are inserted in the above-mentioned openings, so that the attached ferrule deforming or crimping member elements 42 and 44 fit into the transverse channels. The pins are adjustably secured in place by means of caps 46 and 48 and screws 50.

The ferrule deforming or crimping members 42 and 44 are transversely elongated lying transversely across the width of the member 30, and protruding through the surface of the concavities 34 and 36 to press across and into the circumferential surface of a ferrule or metal ring encircling a rope, thus effecting a permanent connection.

In operation, the ferrule or other metal ring 50 is slipped onto the end of the rope and the rope end laid in the depression suitable to its size. The handles are then clamped together and the ferrule crimped permanently onto the rope.

The caps or heads 46 and 48 present a sufficient surface so that they may be struck with a mallet or hammer or other suitable tool. It is thus possible that the ferrules are clamped onto the rope by either the squeezing action applied by hand to the handles 16 and 18 or by the percussion impact of the hammer or mallet applied to the heads 46 and 48, or by both of these instrumentalities.

It will thus be seen that a sturdy, simply constructed and very effective tool has been created for protecting rope ends against fraying.

A device has been described having two spaces for accommodating two sizes of rope. It is to be understood that the device may be made with one such space, two, or such plurality as is desired.

For purposes of exemplification particular embodiments of the invention have been shown and described according to the best present understanding thereof. However, it will be apparent that many changes and modifications in the arrangement and construction of the parts thereof may be resorted to without departing from the true spirit and scope of the invention.

I claim:

1. A tool for binding rope ends comprising a pair of elongated juxtaposed clamping members pivoted to each other at a corresponding end of each to form a fulcrum, said clamping members also provided with mating surfaces handles for applying pressure to an area between said fulcrum and said handles, a cavity on each of said mating surfaces coinciding to form a substantially circular space for receiving rope, a crimping element held by one of said clamping members and protruding into the concavities of one of said clamping means for crimping and clamping a ferrule for permanent engagement with a rope placed between said clamping members.

2. A tool for binding rope ends comprising a pair of elongated juxtaposed clamping members having pivotal connection to each other at a corresponding end of each, complementary mating surfaces on said clamping members, concavities on each of said mating surfaces coinciding to form substantially circular spaces of different size for receiving rope of various sizes, means carried by one of said members protruding into the concavity thereon for clamping metal rings permanently onto rope placed between said clamping members, said means comprising crimping elements elongated transversely and protruding transversely into said concavities, head members attached by means of pins to said crimping members and providing surfaces suitable for receiving blows from an impact means.

3. In a tool for binding rope ends a lower clamping member and an upper superimposed clamping member, a link, a pivotal connection between each end of said link and an end of each of said clamping members, concave substantially semicircular surfaces on one of said clamping members, complementary concave substantially semicircular surfaces on the other of said clamping members so positioned as to mate with the concave surfaces on the one clamping member, and provide substantially circular openings of varying sizes for receiving rope of varying size, crimping elements carried in bores in one of said clamping members, protruding transversely therethrough and protruding into the semicircular concave surfaces thereof, impact surfaces attached to said crimping members providing a suitable surface for receiving the blows of an impact means, a handle on each of said clamping members, said concave surfaces and said crimping means lying between said link and said handles.

4. A device for preventing fraying of rope comprising a pair of elongated juxtaposed members, a link, a pivotal connection between said link and a corresponding end of each of said elongated members, the remaining ends of said elongated members constituting handles, substantially semicircular concave mating surfaces of varying sizes positioned transversely on said elongated members, ferrule deforming means carried by one of said elongated members and protruding from at least one of said concave surfaces, an impact area on said deforming means presenting a surface capable of receiving blows from an impact means, said impact area lying between said link and said handles.

5. A device for clamping ferrules to rope or other cables which is capable of hand squeezing operation or percussion clamping, comprising means for holding varying sizes of cable for clamping ferrules thereon, ferrule deforming means, superimposed handles for applying pressure to said ferrule deforming means, and impact surfaces for receiving percussion impact for clamping said ferrules on said cables.

References Cited in the file of this patent

UNITED STATES PATENTS

| | | |
|---|---|---|
| 993,923 | Walter | May 30, 1911 |
| 2,035,686 | Briegel | Mar. 31, 1936 |
| 2,079,498 | Douglas | May 4, 1937 |
| 2,616,316 | Dupre | Nov. 4, 1952 |
| 2,714,827 | Kusiv et al. | Aug. 9, 1955 |
| 2,727,416 | Labuza | Dec. 20, 1955 |